(12) United States Patent  (10) Patent No.: US 8,770,931 B2
Alvanos et al.  (45) Date of Patent:  Jul. 8, 2014

(54) HYBRID CERAMIC MATRIX COMPOSITE VANE STRUCTURES FOR A GAS TURBINE ENGINE

(75) Inventors: Ioannis Alvanos, West Springfield, MA (US); Gabriel L. Suciu, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 630 days.

(21) Appl. No.: 13/116,144

(22) Filed: May 26, 2011

(65) Prior Publication Data
US 2012/0301303 A1  Nov. 29, 2012

(51) Int. Cl.
*F01D 9/04* (2006.01)
*F01D 25/24* (2006.01)

(52) U.S. Cl.
USPC ........ 415/200; 415/136; 415/190; 415/209.2; 415/209.4; 415/210.1; 29/889.22

(58) Field of Classification Search
USPC .............. 415/136, 138, 189–191, 200, 208.2, 415/209.2–209.4, 210.1; 416/189–192, 416/193 R, 193 A, 241 B; 29/889.21, 889.22
See application file for complete search history.

(56) References Cited

U.S. PATENT DOCUMENTS

| | | | |
|---|---|---|---|
| 4,861,229 A | 8/1989 | Halstead | |
| 5,839,878 A * | 11/1998 | Maier | 415/209.2 |
| 6,884,030 B2 | 4/2005 | Darkins, Jr. et al. | |
| 7,452,182 B2 | 11/2008 | Vance et al. | |
| 2009/0110549 A1* | 4/2009 | Snook et al. | 415/191 |
| 2010/0054932 A1 | 3/2010 | Schiavo | |
| 2010/0129211 A1* | 5/2010 | Hart et al. | 415/209.3 |
| 2011/0171018 A1* | 7/2011 | Garcia-Crespo | 415/208.2 |
| 2011/0189008 A1* | 8/2011 | Brunt et al. | 415/209.3 |
| 2011/0200430 A1* | 8/2011 | Burdgick et al. | 415/209.3 |

* cited by examiner

*Primary Examiner* — Christopher Verdier
(74) *Attorney, Agent, or Firm* — Carlson, Gaskey & Olds, P.C.

(57) ABSTRACT

A vane structure for a gas turbine engine includes a multiple of CMC airfoil sections integrated between a CMC outer ring and a metal alloy inner ring.

19 Claims, 7 Drawing Sheets

HYBRID CERAMIC MATRIX COMPOSITE VANE STRUCTURES FOR A GAS TURBINE ENGINE

BACKGROUND

The present disclosure relates to a gas turbine engine, and more particularly to hybrid Ceramic Matrix Composites (CMC) turbine components therefor.

Components in sections of gas turbine engines which operate at elevated temperatures in a strenuous, oxidizing type of gas flow environment are typically manufactured of high temperature superalloys. CMC materials possess a capability to withstand the strenuous, oxidizing type of gas flow environment under compression, but may not be as tolerable in tensile and inter-laminar conditions. These capabilities result in design requirements which may heretofor tend to increase weight, cost and complexity.

SUMMARY

A vane structure for a gas turbine engine according to an exemplary aspect of the present disclosure includes a multiple of CMC airfoil sections integrated between a CMC outer ring and a metal alloy inner ring. The vane structure may form part of a Low Pressure Turbine.

A method of assembling a vane structure for a gas turbine engine according to an exemplary aspect of the present disclosure includes inserting a multiple of CMC airfoil sections between a CMC outer ring and a metal alloy inner ring.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
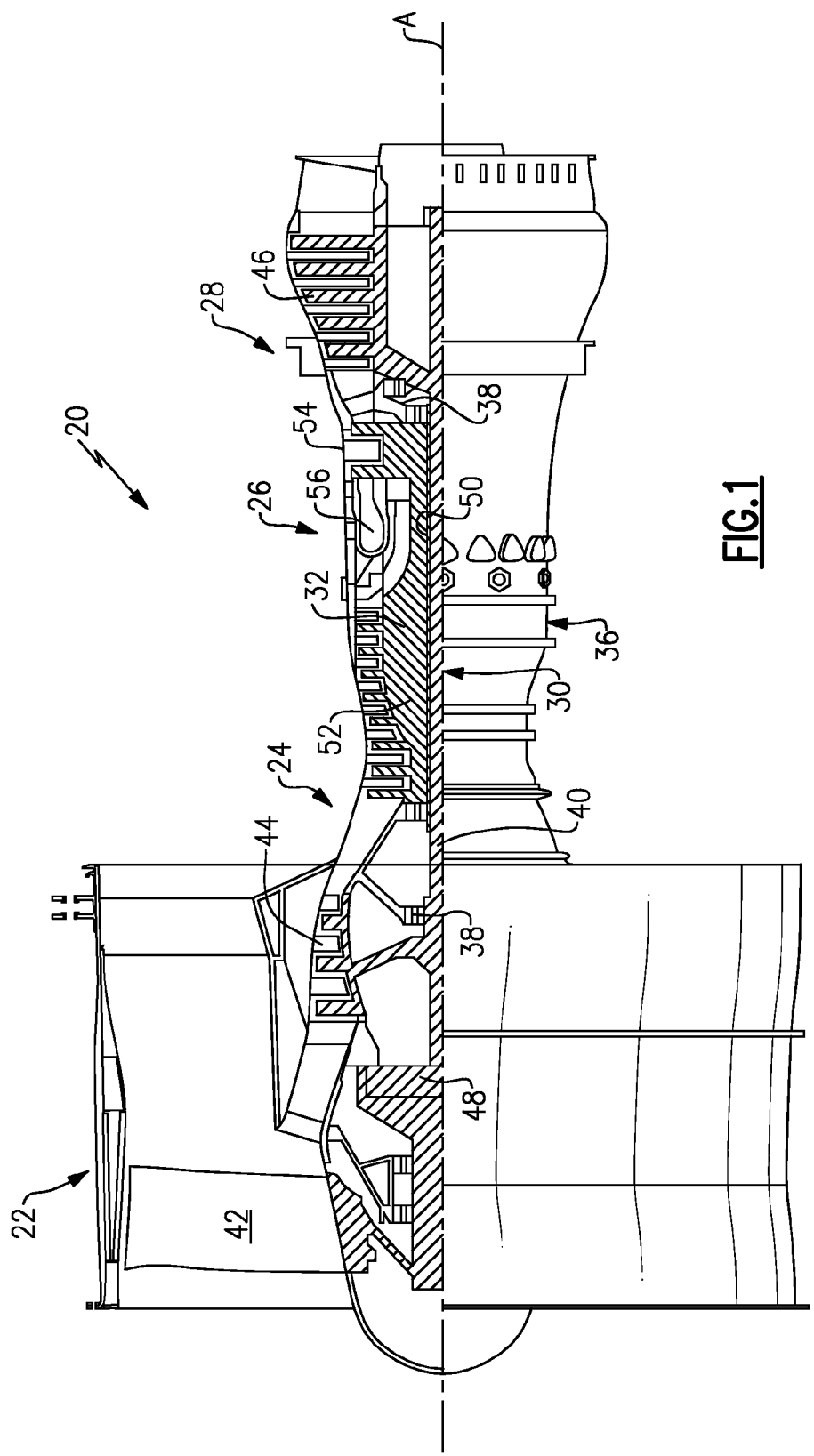
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 54, 46 rotationally drive the respective low speed spool 30 and high speed spool 32 in response to the expansion.

Figure 2:
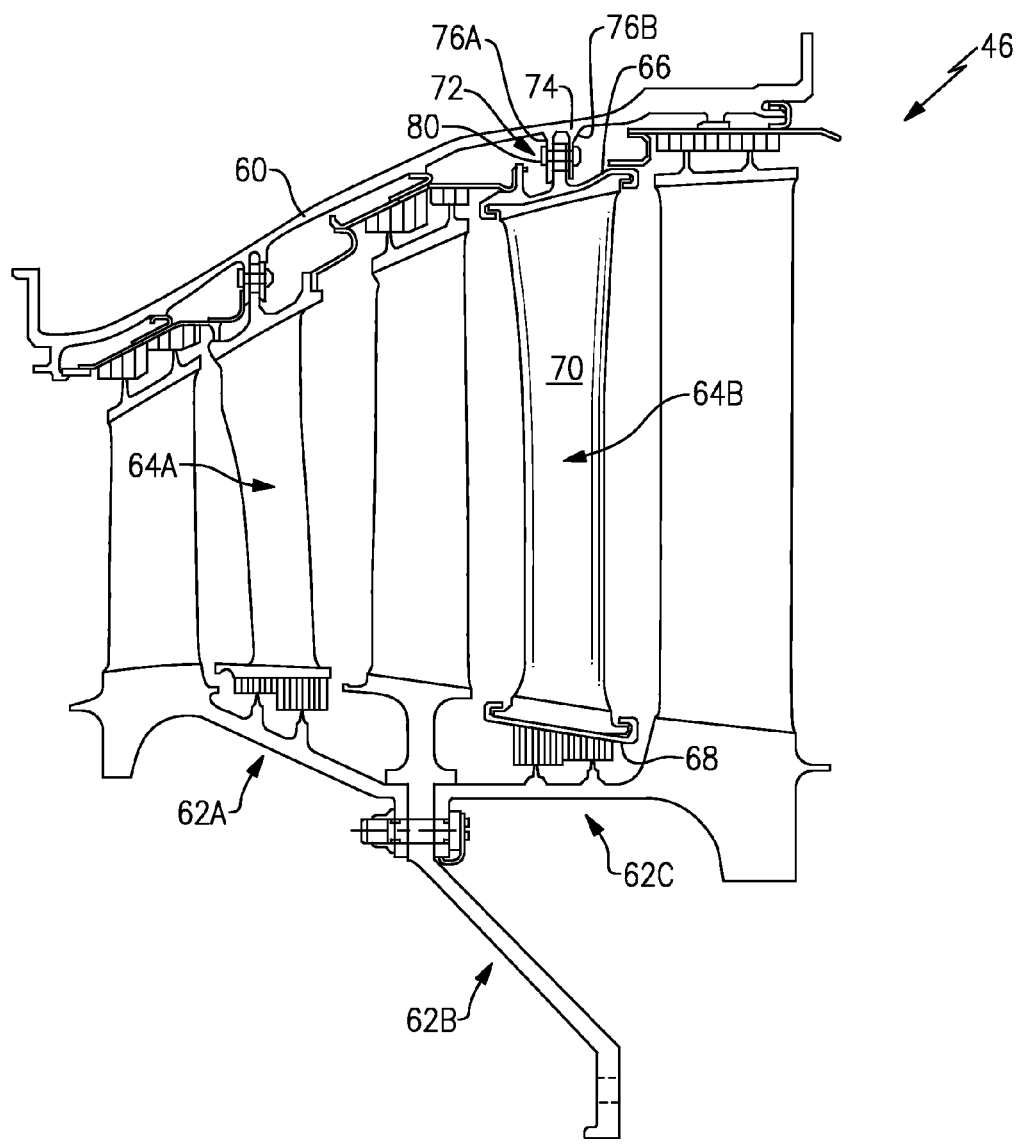
FIG. 2 is an enlarged sectional view of a section of the gas turbine engine.
Figure 2:

With reference to FIG. 2, the low pressure turbine 46 generally includes a low pressure turbine case 60 with a multiple of low pressure turbine stages. In the disclosed non-limiting embodiment, the low pressure turbine case 60 may be manufactured of a ceramic matrix composite (CMC) material or metal superalloy. It should be understood that examples of CMC material for all componentry discussed herein may include, but are not limited to, for example, S200 and SiC/SiC. It should be also understood that examples of metal superalloy for all componentry discussed herein may include, but are not limited to, for example, INCO 718 and Waspaloy. Although depicted as a low pressure turbine in the disclosed embodiment, it should be understood that the concepts described herein are not limited to use with the low pressure turbine as the teachings may be applied to other sections such as the high pressure turbine, high pressure compressor, low pressure compressor and intermediate pressure turbine and intermediate pressure turbine of a three-spool architecture gas turbine engine.

The rotor structures 62A, 62B, 62C are interspersed with vane structures 64A, 64B. It should be understood that any number of stages may be provided. Each vane structure 64A, 64B is manufactured of a hybrid (metal superalloy and ceramic matrix composite (CMC)) material to define a ring-strut ring full hoop structure. It should be understood that the term full hoop is defined herein as an uninterrupted member such that the vanes do not pass through apertures formed therethrough as in conventional stator assemblies.

Ceramic matrix composite (CMC) materials advantageously provide higher temperature capability than metal and a high strength to weight ratio. The vane structure 64B will be described in detail hereafter, however, it should be understood that each of the vane structures 64A, 64B are generally comparable such that only the single vane structure 64B need be described in detail.

Figure 3:
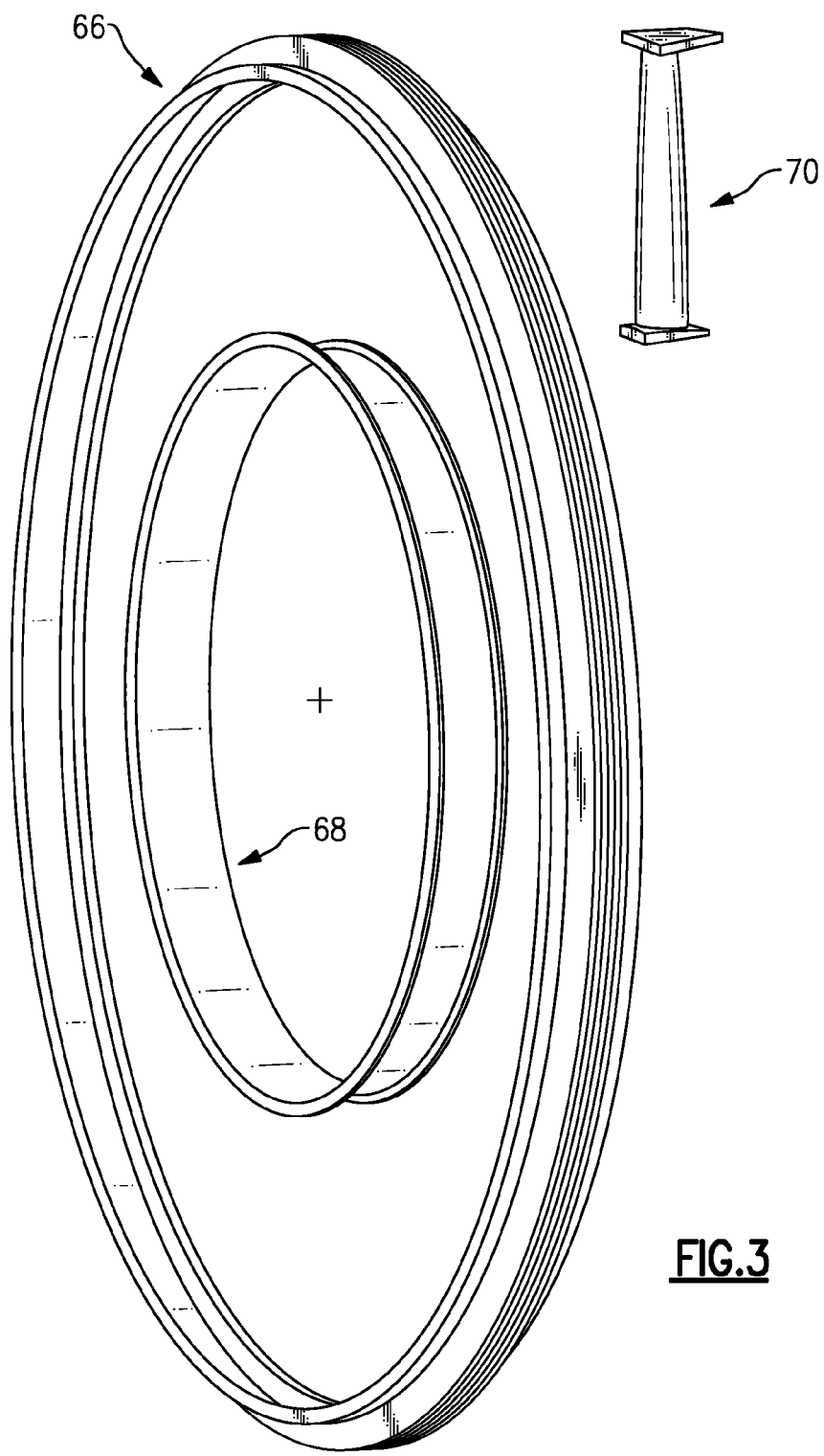
FIG. 3 is an exploded perspective view of a CMC ring vane structure for a gas turbine engine.
Figure 4:
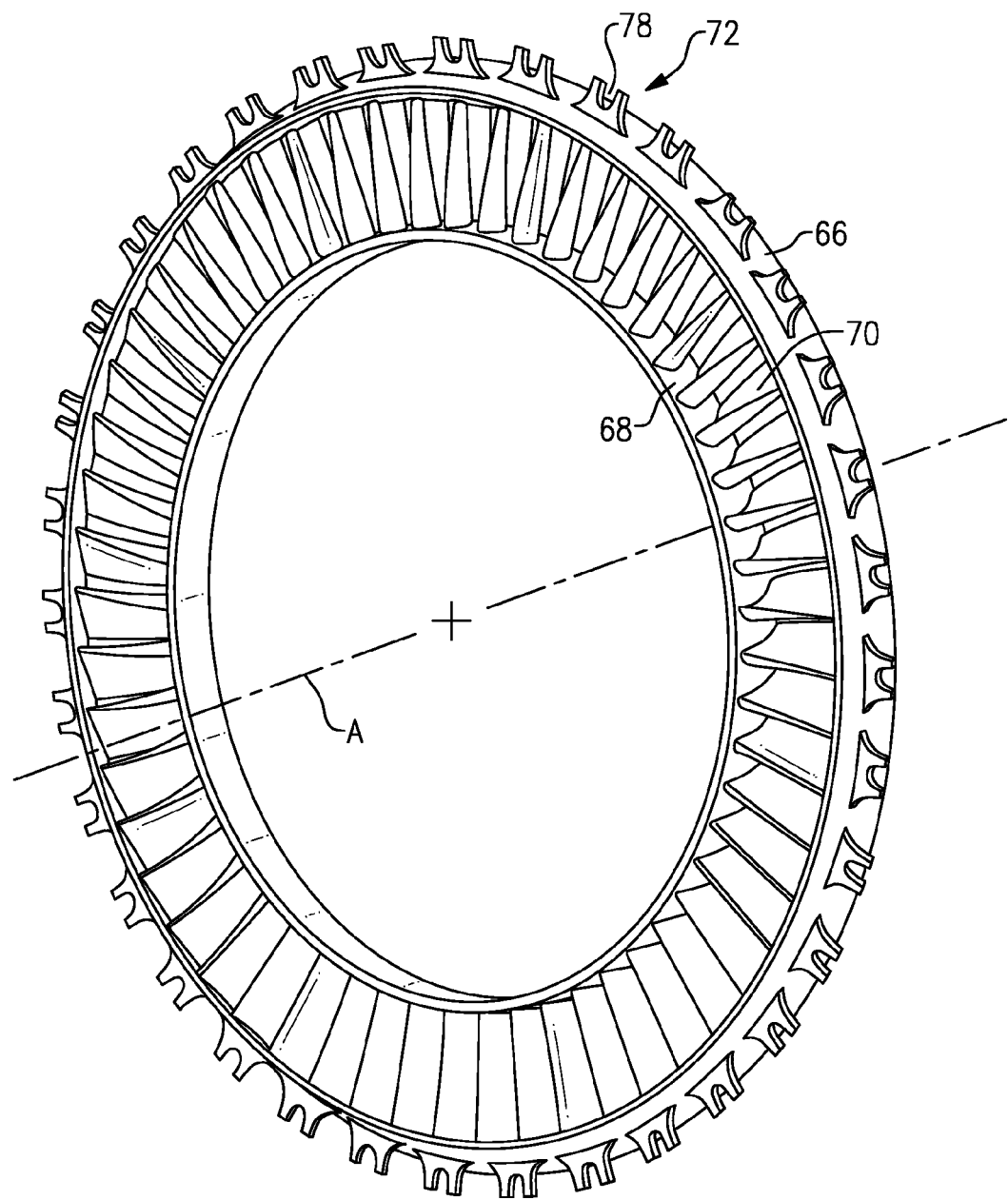
FIG. 4 is a perspective view of the CMC ring vane structure for a gas turbine engine.

The vane structure 64B generally includes a CMC outer ring 66 and a metal alloy inner ring 68 with a multiple of CMC airfoil sections 70 therebetween (also illustrated in FIGS. 3 and 4). The CMC outer ring 66 and the metal alloy inner ring 68 form full hoops to receive the multiple of airfoil sections 70. It should be understood that various CMC manufacturability is applicable. The metal alloy inner ring 68 may be manufactured of high temperature superalloys such as those based on at least one of Fe, Co, and Ni.

The CMC outer ring 66 may include a splined interface 72 for attachment to the low pressure turbine case 60. The low pressure turbine case 60 includes a support structure 74 which extends radially inward toward the engine axis A. The support structure 74 includes paired radial flanges 76A, 76B which receive the splined interface 72 therebetween. The splined interface 72 is axially centered along the airfoil sections 70 and include open slots 78 to receive a fastener 80 supported by the paired radial flanges 76A, 76B.

Figure 5:
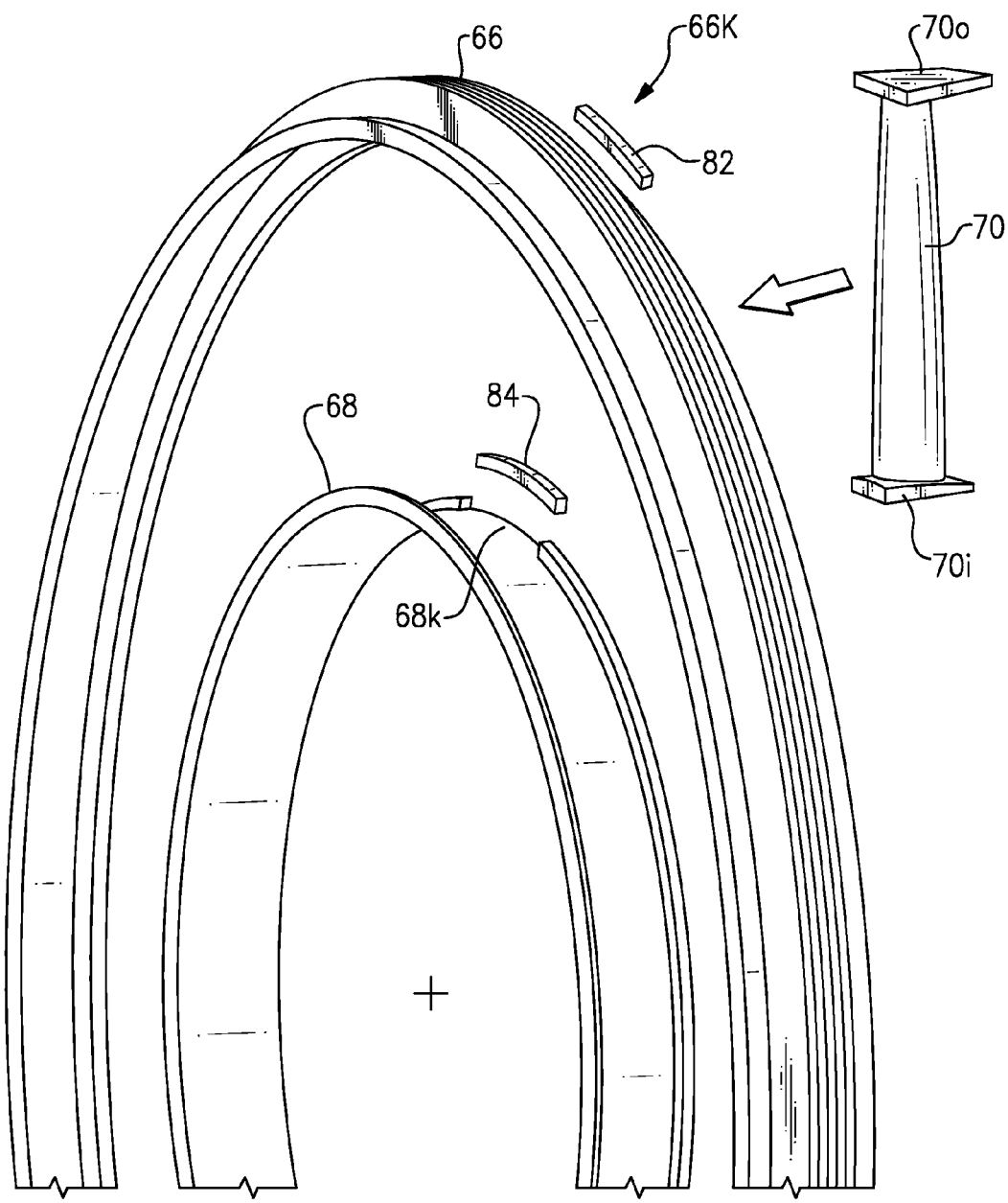
FIG. 5 is an exploded perspective view of a CMC ring vane structure with a key slot assembly.

The airfoil sections 70 may be assembled into the CMC outer ring 66 and the metal alloy inner ring 68 in a key slot manner. That is, each airfoil section 70 may be assembled through one or more key slots 66K, 68K (FIG. 5) in either or both of the CMC outer ring 66 and metal alloy inner ring 68 then rotated into their final circumferential position. The key slot 66K, 68K is then closed with a key 82, 84 to lock each airfoil section 70 into place. It should be understood that various key slot arrangements may be provided to include bonds and mechanical locks. It should also be understood that an inner airfoil platform 70i and an outer airfoil platform 70o may include platform edge structures which engage each adjacent airfoil platform edge structure in a complementary geometry.

Figure 6:
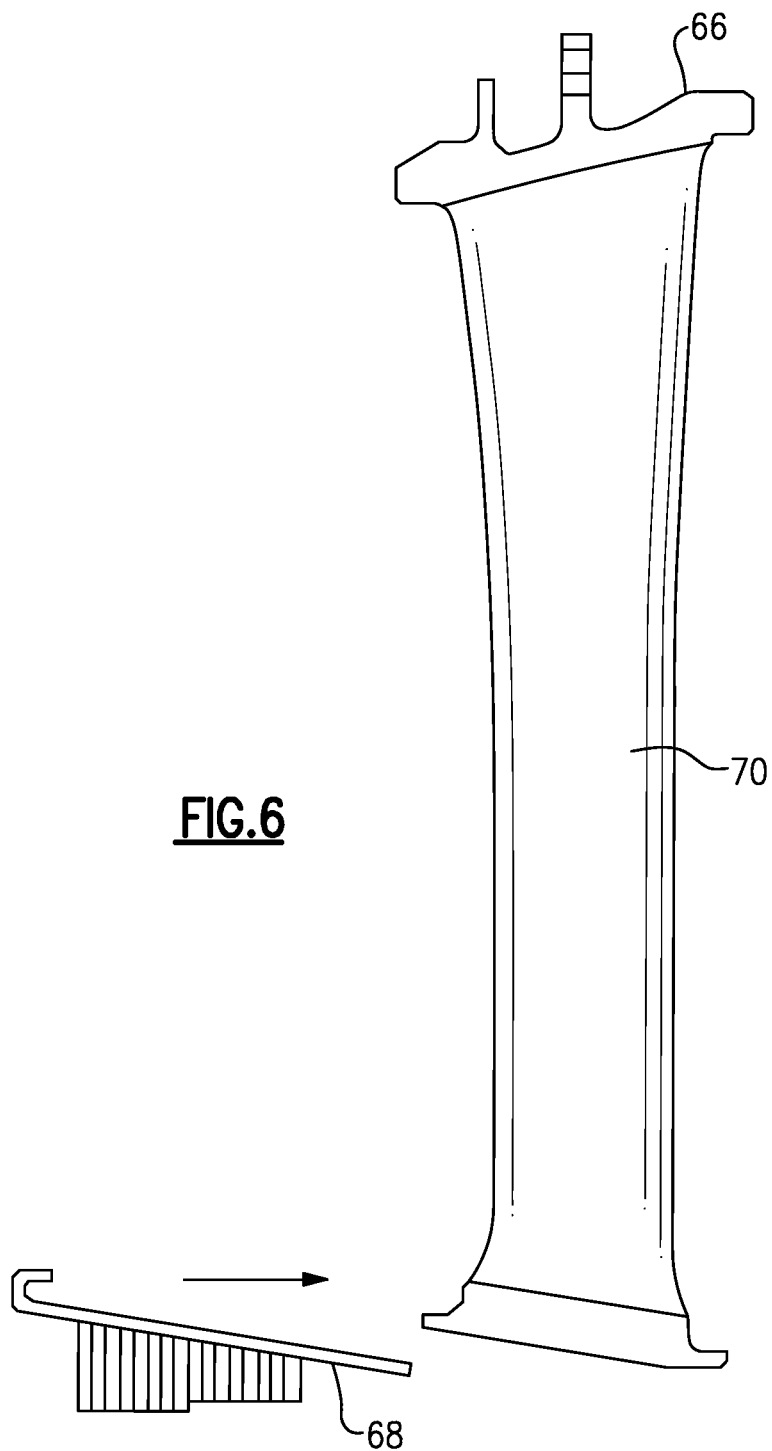
FIGS. 6-8 are assembly views of the CMC ring vane structure in which the metal alloy inner ring is bent into position.
Figure 7:
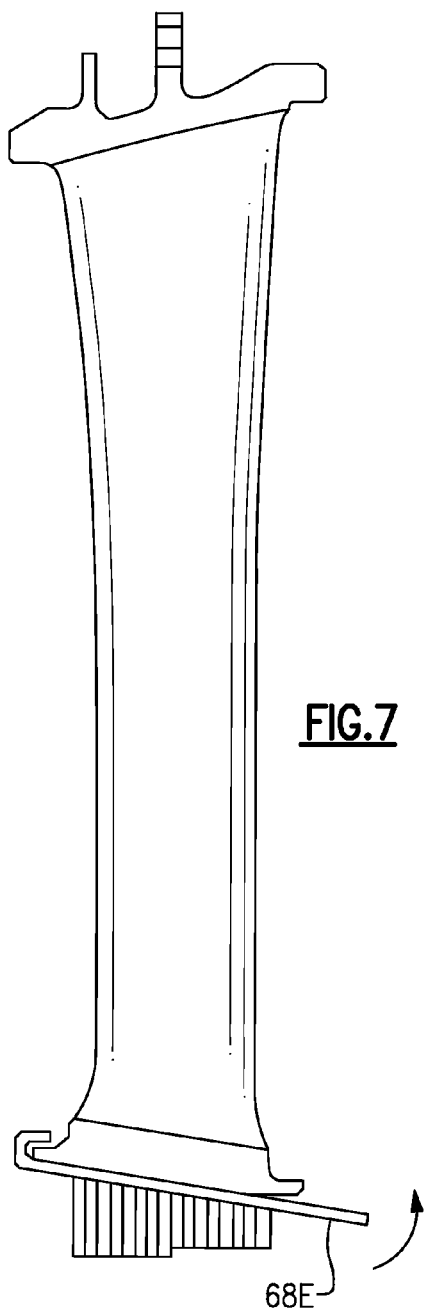
Figure 8:
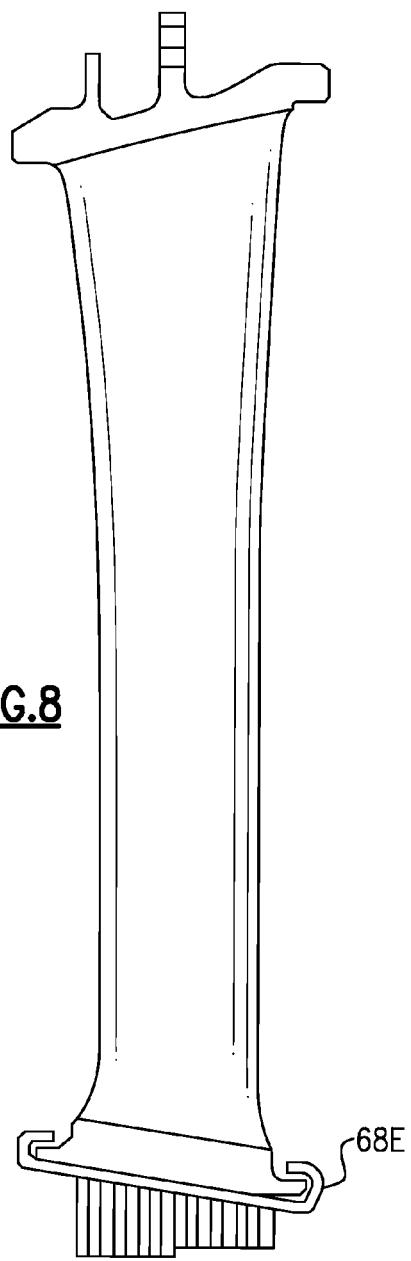

In another non-limiting embodiment, the airfoil sections 70 and the CMC outer ring 66 are bonded as a CMC subassembly (FIG. 6). The metal alloy inner ring 68 is then located within an inner diameter edge of the airfoil sections 70 by bending an edge 68E thereof at least partially about an inner airfoil platform 70i to lock each airfoil section 70 into place (FIGS. 7 and 8).

The thermal growth of CMC is much less than that of a typical metal alloy. The vane structure disclosed herein advantageously utilizes this mismatch by allowing the metal alloy inner ring 68 to drive the airfoil sections 70 section into compression, while the CMC outer ring 66 is in a tensile hoop stress field. The CMC outer ring 66 may wrap CMC fibers in an orientation that will maximize effectiveness for a tensile hoop induced stress field. Torsional effects are accommodated by the metal alloy inner ring 68 to drive the airfoil sections 70.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A vane structure for a gas turbine engine comprising:
   a CMC outer ring;
   a metal alloy inner ring; and
   a multiple of CMC airfoil sections between said CMC outer ring and said metal alloy inner ring.

2. The vane structure as recited in claim 1, wherein said multiple of CMC airfoil sections are within a Low Pressure Turbine.

3. The vane structure as recited in claim 1, further comprising a splined interface which extends from said CMC outer ring.

4. The vane structure as recited in claim 1, wherein said multiple of CMC airfoil sections are bonded to said CMC outer ring.

5. The vane structure as recited in claim 1, wherein said metal alloy inner ring includes a key slot to receive said multiple of CMC airfoil sections individually.

6. The vane structure as recited in claim 1, wherein said CMC outer ring includes a key slot to receive said multiple of CMC airfoil sections individually.

7. The vane structure as recited in claim 1, wherein each of said multiple of CMC airfoil sections include an inner platform structure and an outer platform structure.

8. The vane structure as recited in claim 7, wherein said inner platform structure provides a complementary geometry to abut each adjacent inner platform structure.

9. The vane structure as recited in claim 8, wherein said metal alloy inner ring extends at least partially around said inner platform structure.

10. The vane structure as recited in claim 7, wherein said outer platform structure provides a complementary geometry to abut each adjacent outer platform structure.

11. A Low Pressure Turbine for a gas turbine engine comprising:
    a CMC outer ring;
    a metal alloy inner ring; and
    a multiple of Low Pressure Turbine CMC airfoil sections between said CMC outer ring and said metal alloy inner ring.

12. The Low Pressure Turbine as recited in claim 11, further comprising a low pressure turbine case, said CMC outer ring mounted to said low pressure turbine case through a splined interface.

13. The Low Pressure Turbine as recited in claim 12, wherein said low pressure turbine case is manufactured of CMC.

14. The Low Pressure Turbine as recited in claim 12, further comprising a support structure which extends radially inward from said low pressure turbine case.

15. A method of assembling a vane structure for a gas turbine engine comprising:
    inserting a multiple of CMC airfoil sections between a CMC outer ring and a metal alloy inner ring.

16. The method as recited in claim 15, further comprising:
    individually inserting the multiple of CMC airfoil sections through a key slot in the CMC outer ring.

17. The method as recited in claim 15, further comprising:
    bonding the multiple of CMC airfoil sections to the CMC outer ring.

18. The method as recited in claim 15, further comprising:
    individually inserting the multiple of CMC airfoil sections through a key slot in the metal alloy inner ring.

19. The method as recited in claim 15, further comprising:
    bending a portion of the metal alloy inner ring at least partially around a platform of the multiple of CMC airfoil sections.

* * * * *